United States Patent [19]

Tyrell et al.

[11] Patent Number: 4,661,567
[45] Date of Patent: Apr. 28, 1987

[54] POLYCARBONATE END CAPPED WITH VINYLENE CARBONATE COMPOUND

[76] Inventors: John A. Tyrell, R.R. #2, Box 76D; Gary L. Freimiller, 313 Washington, both of Mt. Vernon, Ind. 47620

[21] Appl. No.: 650,871

[22] Filed: Sep. 14, 1984

[51] Int. Cl.$^4$ ............................................. C08G 63/62
[52] U.S. Cl. .................................. 525/468; 524/601; 524/611; 525/439; 525/445; 525/462; 528/179; 528/198
[58] Field of Search ............... 525/468, 462, 439, 445; 528/179, 198; 524/601, 611

[56] References Cited

U.S. PATENT DOCUMENTS 4,327,207  4/1982  Lazarus ................................ 525/439
4,348,314  9/1982  Lazarus et al. ....................... 525/439

Primary Examiner—Harold D. Anderson

[57] ABSTRACT

Carbonate polymers containing at least one terminal group represented by the general formula

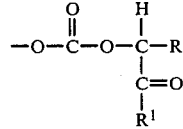

wherein R and R$^1$ are independently selected from hydrogen and monovalent hydrocarbon radicals.

21 Claims, No Drawings

POLYCARBONATE END CAPPED WITH VINYLENE CARBONATE COMPOUND

BACKGROUND OF THE INVENTION

The importance of end-capping or terminating carbonate polymers with certain end or terminal groups is well known. Carbonate polymers which are not end-capped are generally insufficiently thermally stable since the free end phenolic hydroxyl groups provide reactive sites which are generally detrimental to the thermal stability of the polymers. Known and commonly used end-capping agents include the phenol compounds such as phenol itself, chroman-I, and paratertiarybutyl phenol.

Other end-capping agents are also known and used in the preparation of carbonate polymers. These include, inter alia, the alkanol amines disclosed in U.S. Pat. No. 3,085,992; the imides disclosed in U.S. Pat. No. 3,399,172; aniline and methyl aniline disclosed in U.S. Pat. No. 3,275,601; and the primary and secondary amines disclosed in U.S. Pat. No. 4,001,184. Some other end capping agents include the aromatic amines disclosed in U.S. Pat. No. 3,028,365; and the ammounium compounds, primary cycloalkyl amines and primary aliphatic or aralkyl amines disclosed in U.S. Pat. No. 4,111,910.

However, according to Schnell, *Chemistry and Physics of Polycarbonates* (1964), page 183, ammonium hydroxide and amines saponify polycarbonates back to the monomers. This is supported by Bolgiano in U.S. Pat. No. 3,223,678 wherein it is disclosed that small amounts of amines such as monoethanolamine and morpholine break or degrade polycarbonate into lower molecular weight polycarbonates. Thus, this area of chemistry is generally not completely understood and is one where the empirical approach is still generally the method used to determine whether a particular compound or class of compounds will function as effective end-capping agents for carbonate polymers. This area is further complicated by the fact that even though a particular compound may be an effective end-capping agent for carbonate polymers, its presence in the carbonate polymer may adversely affect the advantageous physical and mechanical properties of the carbonate polymer.

SUMMARY OF THE INVENTION

The instant invention is directed to carbonate polymers containing terminal groups represented by the general formula $$-O-\overset{O}{\overset{\|}{C}}-O-\overset{H}{\underset{\underset{R^1}{\overset{|}{C=O}}}{\overset{|}{C}}}-R$$

wherein R and $R^1$ are independently selected from hydrogen and monovalent hydrocarbon radicals.

DESCRIPTION OF THE INVENTION

In accordance with the instant invention there are provided carbonate polymers which contain at least one terminal or end-group represented by the general formula

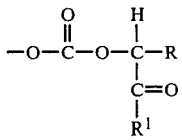

wherein R and $R^1$ are independently selected from hydrogen and monovalent hydrocarbon radicals.

The monovalent hydrocarbon radicals represented by R and $R^1$ are selected from alkyl radicals, aryl radicals, cycloalkyl radicals, aralkyl radicals, and alkaryl radicals.

The alkyl radicals represented by R and $R^1$ may be the straight chain alkyl radicals or the branched alkyl radicals. Preferred alkyl radicals are those containing from 1 to about 12 carbon atoms. Some illustrative non-limiting examples of these preferred alkyl radicals include methyl, ethyl, propyl, isopropyl, butyl, isobutyl, tertiarybutyl, pentyl, neopentyl, hexyl, octyl, and decyl.

The preferred cycloalkyl radicals are those containing from 4 to about 8 ring carbon atoms. Some non-limiting illustrative examples of these cycloalkyl radicals include cyclobutyl, cyclopentyl, cyclohexyl, methylcyclohexyl, and cycloheptyl.

The aryl radicals represented by R and $R^1$ include the unsubstituted aryl radicals and the substituted aryl radicals, preferably the alkyl substituted aryl radicals. The preferred aryl radicals are those containing from 6 to 12 ring carbon atoms. These include phenyl, substituted phenyl, diphenyl, substituted diphenyl, napthyl, and substituted naphthyl.

The preferred aralkyl and alkaryl radicals are those containing from 7 to about 14 carbon atoms.

Some illustrative non-limiting examples of the terminal groups represented by Formula I are set forth in Table I.

TABLE I

| R | $R^1$ |
|---|---|
| $-CH_3$ | $-CH_3$ |
| $-C_2H_5$ | $-C_4H_9$ |
| 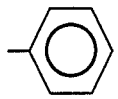 | 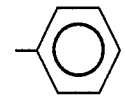 |
| 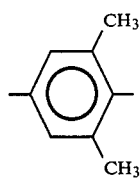 | 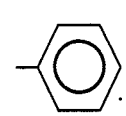 |
| 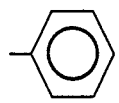 | $-CH_2-\underset{\underset{CH_3}{\overset{|}{|}}}{\overset{CH_3}{\overset{|}{CH}}}-CH_3$ |
| 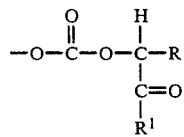 | 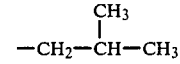 |

TABLE I-continued

| R | R¹ | |
|---|---|---|
| 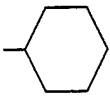 | | 5 |

The carbonate polymers containing the terminal groups of Formula I contain less of the terminal phenolic hydroxyl groups and therefore should generally exhibit improved thermal stability and improved thermal aging properties relative to carbonate polymers containing only the terminal phenolic hydroxyl groups.

The instant carbonate polymers containing the terminal groups of Formula I may be prepared by a number of different methods. One of these methods involves introducing the end-capping agents described hereinafter into the polymer forming reaction in an end-capping amount. These polymer forming reactions are conventional and are well known in the art and include such conventional processes as the interfacial polymerization process, the melt polymerization process, and the like. Another method, and one which is preferred, is to react an end-capping amount of the end-capping agent with a preformed high molecular weight aromatic carbonate polymer to form a carbonate polymer containing the terminal groups of Formula I.

The end-capping agents utilized to form the aromatic carbonate polymers containing the terminal groups of Formula I may be represented by the general formula

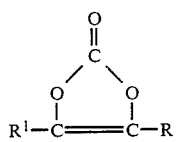
II.

wherein R and R¹ are as defined hereinafore.

The end-capping agents of Formula II are well known in the art and are generally commercially available or may be readily prepared by known methods. Some illustrative non-limiting examples of the end-capping agents of Formula II include:

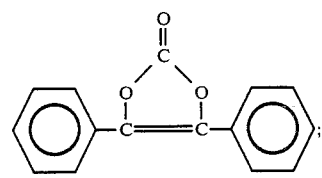

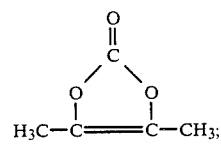

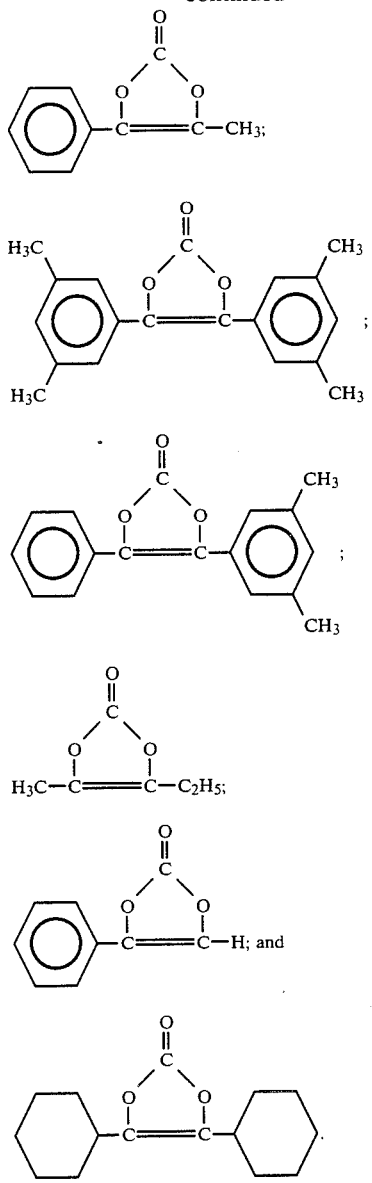

Preferred end-capping agents of Formula II are those wherein R and R¹ are independently selected from monovalent hydrocarbon radicals, with the aryl radicals being the preferred monovalent hydrocarbon radicals. Thus, the preferred terminal groups of Formula I are those wherein R and R¹ are independently selected from monovalent hydrocarbon radicals with the more preferred terminal groups of Formula I being those wherein R and R¹ are independently selected from aryl radicals.

A particularly useful method of making the carbonate polymers containing at least one terminal group of Formula I is by first preforming the high molecular weight aromatic carbonate polymers and thereafter reacting these preformed aromatic carbonate polymers with an end-capping amount of at least one compound of Formula II. By end-capping amount is meant an amount effective to end-cap the high molecular weight aromatic carbonate polymers, i.e., form at least one terminal group of Formula I on the ends of these carbonate polymers. Generally, this amount is in the range of from about 50 to about 800 mole percent based on the amount of phenol end groups present, in the carbonate polymers, and preferably in an amount of from about 100 to about 600 mole percent.

It is, of course, possible to employ a mixture of two or more different end-capping agents of Formula II as well as individual end-capping agents of Formula II. If a mixture of two or more different end-capping agents of Formula II are employed the resultant carbonate polymer will contain a statistical mixture of different terminal groups of Formula I. The amount of these different terminal groups will be generally dependant upon the amounts of the different end-capping agents utilized.

The high molecular weight aromatic carbonate polymers of the instant invention include the polycarbonates and the copolyester-carbonates. The polycarbonates are well known compounds which are described, along with methods for their preparation, inter alia, in U.S. Pat. Nos. 3,989,672, 3,275,601, and 3,028,365, and Schnell, H., *Chemistry and Physics of Polycarbonates*, Interscience Publishers, New York, N.Y. 1964. The polycarbonates contain at least one recurring structural unit represented by the general formula

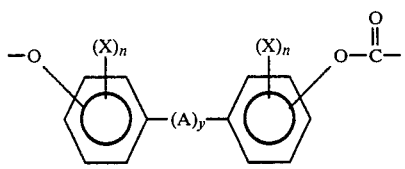

III.

wherein:

X is independently selected from monovalent hydrocarbon radicals, halogen radicals, and monovalent hydrocarbonoxy radicals;

A is a divalent hydrocarbon radicals, —O—, —S—, —S—S—,

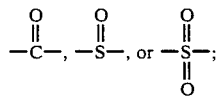

y is either zero or one; and n is independently selected from positive integers having a value of from 0 to 4 inclusive.

The monovalent hydrocarbon radicals represented by X include the alkyl radicals, preferably those containing from 1 to about 12 carbon atoms, the cycloalkyl radicals, preferably those containing from 4 to about 8 ring carbon atoms, aryl radicals, preferably those containing from 6 to 12 ring carbon atoms, aralkyl radicals, preferably those containing from 7 to about 14 carbon atoms, and alkaryl radicals, preferably those containing from 7 to about 14 carbon atoms.

The divalent hydrocarbon radicals represented by A include the alkylene radicals, preferably those containing from 2 to about 15 carbon atoms, the alkylidene radicals, preferably those containing from 1 to about 15 carbon atoms, the cycloalkylene radicals, preferably those containing from 4 to about 16 ring carbon atoms, and the cycloalkylidene radicals, preferably those containing from 4 to about 16 ring carbon atoms.

The monovalent hydrocarbonoxy radicals represented by X may be represented by the general formula —OR' wherein R' is a monovalent hydrocarbon radical of the type described hereinafore.

The preferred halogen radicals represented by X are the chlorine and bromine radicals.

These polycarbonates may be conveniently prepared by the reaction of a dihydric phenol with a carbonate precursor. The dihydric phenols employed in the practice of the instant invention are known dihydric phenols in which the sole reactive groups are the two phenolic hydroxyl groups. Some of these dihydric phenols may be represented by the general formula

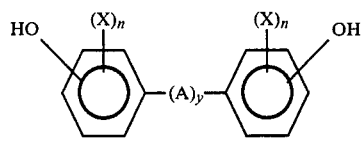

IV.

wherein X, A, y and n are as defined hereinafore.

Some illustrative non-limiting examples os suitable dihydric phenols include:
2,2-bis(4-hydroxyphenyl)propane (bisphenol-A);
1,1-bis(4-hydroxyphenyl)-1-phenyl ethane;
1,1-bis(4-hydroxyphenyl)-1,1-diphenyl methane;
1,1-bis(4-hydroxyphenyl)cyclohexane;
2,2-bis(3-propyl-4-hydroxyphenyl)decane;
2,2-bis(4-hydroxyphenyl)nonane;
2,2-bis(4-hydroxyphenyl)heptane;
2,2-bis(3-ethyl-4-hydroxyphenyl)propane;
2,2-bis(3,5-dibromo-4-hydroxyphenyl)propane;
1,1-bis(3-methyl-4-hydroxyphenyl)ethane;
p,p'-dihydroxdiphenyl;
3,3'-dimethyl-4,4'-dihydroxydiphenyl;
bis(3-chloro-5-methyl-4-hydroxyphenyl)ether;
bis(4-hydroxyphenyl)sulfone;
bis(3-methyl-4-hydroxyphenyl)sulfone;
bis(3,5-diisopropyl-4-hydroxyphenyl)sulfoxide; and
bis(4-hydroxyphenyl)sulfoxide.

A further group of dihydric phenols outside the scope of the generic formula IV which may be used in the practice of the instant invention includes the dihydroxy benzenes and the halo- and alkyl substituted dihydroxy benzenes such as, for example, resorcinol, hydroquinone, 1,4-dihydroxy-2-chlorobenzene, 1,4-dihydroxy-2-bromobenzene, 1,4-dihydroxy-2,3-dichlorobenzene, 1,4-dihydroxy-2-methylbenzene, 1,4-dihydroxy-2,3-dimethylbenzene, and 1,4-dihydrox-2-bromo-3-propylbenzene.

Other dihydric phenols of interest include the phthalein type bisphenols which are disclosed in U.S. Pat. Nos. 3,035,012, 3,036,036, 3,036,037, 3,036,038, and 3,036,039.

It is, of course, possible to employ mixtures of two or more different dihydric phenols in preparing the thermoplastic aromatic polycarbonates of the instant invention.

The carbonate precursors employed in the preparation of the polycarbonates of the instant invention include the carbonyl halides, the bishaloformates, and the diarylcarbonates, depending upon the polymerization process utilized in the preparation of the instant polycarbonates. The carbonyl halides which may be employed include carbonyl bromide, carbonyl chloride, and mixtures thereof. Typical of the diaryl carbonates which may be employed are diphenyl carbonate; di(halophenyl)carbonates such as di(chlorophenyl)carbonate, di(bromophenyl)carbonate, di(trichlorophenyl) carbonate, di(tribromophenyl)carbonate, and the like; di(alkylphenyl)carbonates such as di(tolyl)carbonate, and the like; di(naphthyl)carbonate, di(chloronaphthyl)carbonate, phenyl tolyl carbonate, chlorophenyl chloronaphthyl carbonate, and the like; or mixtures thereof. The bishaloformates suitable for use herein include the bishaloformates of dihydric phenols such as the bischloroformate of hydroquinone, bischloroformate of bisphenol-A, and the like; the bishaloformates of glycols such as, for example, bischloroformate of ethylene glycol, bischloroformate of neopentyl glycol, bischloroformate of polyethylene glycol, and the like.

Also included within the scope of the instant invention are the high molecular weight randomly branched aromatic polycarbonates. These randomly branched thermoplastic polycarbonates are prepared by reacting a minor amount of at least one polyfunctional organic compound with the aforedescribed dihydric phenol and the carbonate precursor. Some of the polyfunctional organic compounds useful in making the randomly branched polycarbonates are disclosed in U.S. Pat. Nos. 3,635,895, 4,001,184, 3,525,712, 3,816,373, 4,204,047 and 4,294,953.

These polyfunctional organic compounds are generally aromatic and contain at least three functional groups which may be hydroxyl, carboxyl, carboxylic anhydride, haloformyl, and mixtures thereof. Some illustrative non-limiting examples of these polyfunctional organic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, and the like.

In the practice of the instant invention it is generally preferred to form the instant polycarbonates, i.e., those containing at least one terminal group represented by Formula I, by first preparing the high molecular weight aromatic polycarbonates and thereafter reacting these preformed polycarbonates with an end-capping amount of at least one end-capping compound of Formula II. A particularly useful method for preparing the carbonate polymers containing the terminal groups of Formula I is to heat a mixture of the preformed polycarbonate containing at least one terminal phenolic hydroxyl groups and an end-capping amount of at least one end-capping agent of Formula II under temperatures effective for the terminal phenolic hydroxyl groups of said polycarbonate to coreact with the end-capping agent of Formula II to form the terminal groups of Formula I. This reaction may be represented by the general formula phenolic hydroxyl groups of the polycarbonate range from about 150° to about 300° C.

A particulatly useful method of forming the polycarbonates containing the terminal groups of Formula I is to coextrude a mixture of the preformed polycarbonate containing at least one terminal phenolic hydroxyl group and at least one end-capping agent of Formula II.

This method of forming the terminal groups of Formula I is particularly useful with polycarbonates which have been prepared by the melt polymerization process.

This process of forming the terminal groups of Formula I can be used with polycarbonates which already contain other conventional terminal groups such as those formed by the use of conventional chain terminating or end-capping agents such as phenol, tertiarybutyl phenol, and the like. These polycarbonates can be formed by conventional methods wherein the reaction mixture used in the preparation of these polycarbonates contains these conventional chain terminating or end-capping agents. Generally, not all of the terminal phenolic hydroxyl groups will be replaced with these conventional end-capping agents in the polycarbonate forming reaction. That is to say, there will be a certain amount of carbonate polymers which contain the phenolic hydroxyl terminal groups.

In this instance there will be formed a statistical mixture of carbonate polymers containing both the conventional terminal groups and the terminal groups of Formula I. By statistical mixture is meant that some of the carbonate polymers will contain only the conventional terminal groups, some of these polymers will contain only the terminal groups of Formula I, and some of the polymers will contain a conventional terminal group and a terminal group of Formula I.

It is, of course, also possible to form polycarbonates containing the terminal groups of Formula I by using conventional polycarbonate forming processes such as, for example, the interfacial polymerization process, and including an end-capping amount of the end-capping agents of Formula II in the reaction mixture containing, for example, the dihydric phenols of Formula IV and the carbonate precursor such as phosgene.

The copolyester-carbonates of the instant invention are well known compounds which are described, along with their preparation, in U.S. Pat. Nos. 3,169,121 and 4,156,069, both of which are hereby incorporated herein by reference.

Briefly stated, the high molecular weight aromatic

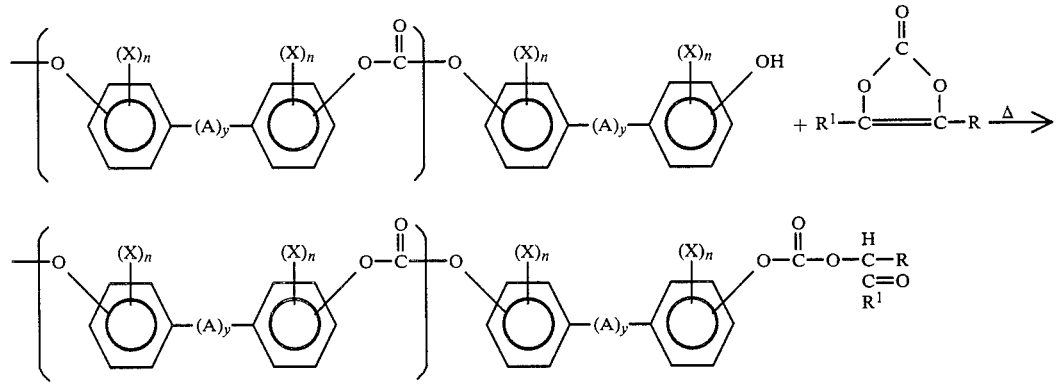

wherein X, A, R, R¹, y and n are as defined hereinafore.

Generally, the temperatures at which the end-capping agents of Formula II will coreact with the terminal copolyester-carbonates of this invention comprise recurring carbonate groups, carboxylate groups, and aromatic carbocyclic groups in the linear polymer chain, in which at least some of the carboxylate groups and at least some of the carbonate groups are bonded directly to ring carbon atoms of the aromatic carbocyclic groups.

These copolyester-carbonate polymers contain ester bonds and carbonate bonds in the polymer chain, wherein the amount of ester bonds is from about 25 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

The copolyester-carbonates may be conveniently prepared by reacting (i) at least one ester precursor such as a difunctional carboxylic acid or an ester forming reactive derivative thereof, (ii) at least one dihydric phenol, and (iii) a carbonate precursor.

The dihydric phenols useful in the preparation of the copolyester-carbonates of this invention are the same as those described hereinafore for the preparation of the polycarbonates. Likewise, the carbonate precursors used in the preparation of the instant copolyester-carbonates are the same as those described hereinafore for the preparation of the polycarbonates.

The difunctional carboxylic acids which may be utilized in the preparation of the copolyester-carbonates of the instant invention generally conform to the formula

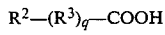

$$R^2-(R^3)_q-COOH \qquad V.$$

wherein $R^3$ is an alkylene, alkylidene, aralkylene, aralkylidene or cycloaliphatic group; an aromatic group such as phenylene, naphthylene, biphenylene, and the like; two or more aromatic groups connected through non-aromatic linkages such as alkylene or alkylidene groups; and the like. $R^2$ is either a carboxyl or a hydroxyl group. The letter q represents one where $R^2$ is a hydroxyl group and either zero or one where $R^2$ is a carboxyl group.

Preferred difunctional carboxylic acids are the aromatic carboxylic acids, i.e., those acids of Formula V wherein q is one, $R^2$ is a carboxyl or a hydroxyl group, and $R^3$ is an aromatic group such as phenylene, substituted phenylene, naphthylene, substituted naphthylene, biphenylene, substituted biphenylene, and the like. The preferred aromatic carboxylic acids are those represented by the general formula

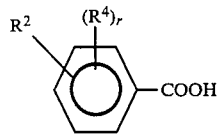

VI.

wherein:

$R^2$ is as defined hereinafore;

$R^4$ is independently selected from monovalent hydrocarbon radicals, halogen radicals, and monovalent hydrocarbonoxy radicals; and r represents a positive integer having a value of from 0 to 4 inclusive.

The monovalent hydrocarbon radicals, halogen radicals, and monovalent hydrocarbonoxy radicals represented by $R^4$ are the same as those described hereinafore for X in Formula III.

Mixtures of two or more of these difunctional carboxylic acids may also be employed, and where the term difunctional carboxylic acid is used herein it is to be understood that it includes mixtures of two or more different difunctional carboxylic acids as well as individual difunctional carboxylic acids.

Particularly useful difunctional carboxylic acids are terephthalic acid, isophthalic acid, and mixtures thereof.

Rather than utilizing the difunctional carboxylic acids per se it is preferred to use the ester forming reactive derivatives of these acids. Particularly useful ester forming reactive derivatives of the difunctional carboxylic acids are the acid halides, preferably the acid dihalides. The preferred acid halides are the acid chlorides, particularly the acid dichlorides. Thus, for example, instead of using the aforementioned acids it is preferred to use terephthaloyl dichloride, isophthaloyl dichloride, and mixtures thereof.

The copolyester-carbonates containing at least one terminal group of Formula I may be prepared by several methods. One of these methods involves first preforming the copolyester-carbonate resin which contains at least one terminal phenol hydroxyl group and thereafter reacting said copolyester-carbonate with an end-capping amount of at least one end-capping compound of Formula II to form the copolyester-carbonates containing at least one terminal group of Formula I.

Another method of forming copolyester-carbonates containing at least one terminal group of Formula I involves utilizing an end-capping amount of at least one end-capping agent of Formula I as one of the reactants in the reaction mixture used in the preparation of the copolyester-carbonates. Thus, for example, if the interfacial polymerization process is used for the production of copolyester-carbonates the reaction mixture will contain (i) at least one dihydric phenol, (ii) at least one difunctional carboxylic acid or an ester forming reactive derivative thereof, (iii) a carbonate precursor, and (iv) an end-capping amount of at least one end-capping agent of Formula II.

A preferred method of forming the copolyester-carbonates containing at least one terminal group of Formula I involves first preforming a copolyester-carbonate containing at least one terminal phenol hydroxyl group and therafter reacting this copolyester-carbonate with an end-capping amount of at least one end-capping agent of Formula II. The copolyester-carbonates containing at least one terminal phenolic hydroxyl group may be formed by any one of a number of well known conventional methods such as, for example, interfacial condensation, melt polymerization, transesterification, and the like.

These preformed copolyester-carbonates containing at least one terminal phenolic hydroxyl group are then reacted with at least one end-capping compound of Formula II to form the copolyester-carbonates containing at least one terminal group of Formula I. The reaction of the end-capping agents of Formula II with the terminal phenolic hydroxyl groups of the copolyester-carbonates proceeds readily by heating a mixture of said copolyester-carbonates and an end-capping amount of said end-capping agents. The temperature at which said mixture is heated is a temperature effective for said end-capping agents to react with said phenolic hydroxyl groups to form the terminal groups of Formula I. Generally this temperature is in the range of from about 150° C. to about 300° C. Generally, the upper temperature at which this mixture is heated is not critical but is limited by such secondary considerations as the thermal stability of the copolyester-carbonate and/or the end-capping agent of Formula II.

It is, of course, possible to utilize a mixture of two or more different end-capping agents of formula II rather than individual end-capping agents of Formula II. In such instance the copolyester-carbonates will contain a statistical mixture of different terminal groups of Formula I. The amounts of these different terminal groups present will generally be dependant upon the amounts of the various end-capping agents of Formula II utilized.

It is also possible to form copolyester-carbonates containing both conventional terminal groups, such as those derived from the use of conventional end-capping or chain terminating agents such as phenol, tertiarybutyl phenol, and the like, and the terminal groups of Formula I. Such copolyester-carbonates may be obtained, for example, by first forming a copolyester-carbonate containing less than 2 moles of conventional terminal groups per mole of copolyester-carbonate and then reacting these incompletly end-capped polycarbonates with at least one end-capping agent of Formula II, said end-capping agent of Formula II being present in an end-capping amount.

A particularly useful method of preparing the copolyester-carbonates containing the terminal groups of Formula I involves first preparing the copolyester-carbonate containing at least one terminal phenolic hydroxyl group by the melt polymerization process, and thereafter reacting said copolyester-carbonate with and end-capping amount of at least one end-capping agent of Formula II. The reaction of the end-capping agents of the instant invention with the copolyseter-carbonate, i.e., with the terminal phenolic hydroxyl groups of the copolyester-carbonate, may be conveniently carried out by preparing a physical admixture of the copolyester-carbonate and the end-capping agents of the instant invention, and thereafter extruding this mixture through an extruder operating at a temperature of at least about 150° C.

Also included within the scope of the instant invention are the randomly branched thermoplastic high molecular weight aromatic copolyester-carbonates. These randomly branched copolyester-carbonates may be prepared by the inclusion within the reaction mixture of at least one polyfunctional organic compound of the type described hereinafore. This polyfunctional organic compound functions as a branching agents for the copolyester-carbonates and results in randomly branched copolyester-carbonates.

The carbonate polymers of the instant invention, i.e., the polycarbonates and the copolyester-carbonates containing terminal groups of Formula I, may optionally have admixed therewith the commonly known and used additives such as, for example, antioxidants; antistatic agents; inert fillers such as clay, talc, mica, and glass; colorants; ultraviolet radiation stabilizers such as the benzophenones, benzotriazoles, and cyanoacrylates; color stabilizers such as the organophosphites disclosed in U.S. Pat. Nos. 3,305,520 and 4,118,370; hydrolytic stabilizers such as the epoxides disclosed in U.S. Pat. Nos. 3,489,716, 4,138,379 and 3,839,247; and flame retardants.

Some particularly useful flame retardants are the alkali and alkaline earth metal salts of sulfonic acids. These types of flame retardants are disclosed in U.S. Pat. Nos. 3,933,734, 3,931,100, 3,978,024, 3,948,851, 3,926,908, 3,919,167, 3,909,490, 3,953,396, 3,953,399, 3,917,559, 3,951,910 and 3,940,366.

DESCRIPTION OF THE PREFERRED EMBODIMENT

The following examples are set forth to further illustrate the present invention and are not to be construed as limiting the invention thereto. Unless otherwise indicated all parts and percentages are parts and percentages by weight.

The following examples illustrate conventional bisphenol-A polycarbonates containing phenolic hydroxyl terminal groups provided by the use of a conventional phenol chain-terminating agent. These examples are presented for comparative purposes only.

EXAMPLE 1

A conventional bisphenol-A polycarbonate chain-stopped with a conventional phenol end-capping agent was extruded at 260° C. IR analysis of the extruded polymer indicated a free hydroxyl content of 383 ppm (parts per million).

EXAMPLE 2

The extruded bisphenol-A polycarbonate of Example 1 was heated at 250° C. for 15 hours. After this thermal aging the free hydroxyl content was determined, by IR analysis, to be 679 ppm.

The following examples illustrate polycarbonates containing at least one terminal group of Formula I.

EXAMPLE 3

500 grams of conventional bisphenol-A polycarbonate chain stopped with a conventional phenol chain-terminating agent were blended with 6 grams of 4,5-diphenyl-1,3-dioxolan-2-one, and the resulting mixture was extruded at 260° C. The extruded material had a free hydroxyl content, as determined by IR analysis, of 336 ppm.

EXAMPLE 4

The extruded material of Example 3 was heated at 250° C. for 15 hours. After this thermal aging the free hydroxyl content, as determined by IR analysis, was 568 ppm.

As seen by a comparison of Examples 1 and 3 the polycarbonate of the instant invention has a lower hydroxyl content than that of the conventional polycarbonate of Example 1. This is an indication that the instant polycarbonate, due to the replacement of some of the terminal phenolic hydroxyl groups by the terminal groups of Formula I, is relatively more thermally stable.

The thermal stability of the instant polycarbonate vis-a-vis the conventional prior art polycarbonate of Example 1 is clearly illustrated by a comparison of Examples 2 and 4. As a polycarbonate resin thermally degrades it liberates free hydroxyl groups. Thus, Examples 2 and 4 illustrate that the polycarbonate of the instant invention exhibits superior heat aging characteristics than a prior art conventional polycarbonate of the type tested in Example 2.

The invention has been described in the above specification and illustrated by reference to specific embodiments in the illustrative examples. However, it is to be understood that these embodiments are not intended to limit the invention since changes and modifications in the specific details disclosed herein can be made without departing from the scope or spirit of the invention.

What is claimed is:

1. High molecular weight aromatic carbonate polymer comprising at least one recurring structural unit represented by the formula

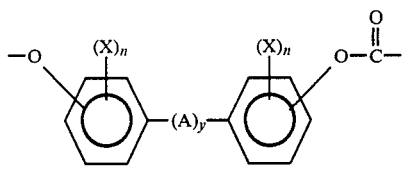

wherein
X is independently selected from monovalent hydrocarbon radicals, halogen radicals, or monovalent hydrocarbonoxy radicals,
A is selected from divalent hydrocarbon radicals, —O—, —S—, —S—S—,

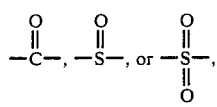

y is either zero or one, and
n is independently selected from integers having a value of from 0 to 4 inclusive,
containing at least one terminal group represented by the general formula

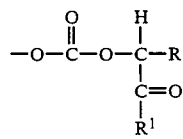

wherein R and $R^1$ are independently selected from hydrogen or monovalent hydrocarbon radicals.

2. The polymer of claim 1 wherein said monovalent hydrocarbon radicals are selected from alkyl radicals, aryl radicals, aralkyl radicals, or alkaryl radicals.

3. The polymer of claim 1 wherein R and $R^1$ are independently selected from monovalent hydrocarbon radicals.

4. The polymer of claim 3 wherein said monovalent hydrocarbon radicals are selected from alkyl radicals, aryl radicals, aralkyl radicals, or alkaryl radicals.

5. The polymer of claim 4 wherein said monovalent hydrocarbon radicals are selected from aryl radicals or alkaryl radicals.

6. The polymer of claim 1 wherein said carbonate polymer is polycarbonate.

7. The polymer of claim 6 wherein R and $R^1$ are independently selected from monovalent hydrocarbon radicals.

8. The polymer of claim 7 wherein said monovalent hydrocarbon radicals are selected from alkyl radicals, aryl radicals, aralkyl radicals, or alkaryl radicals.

9. The polymer of claim 8 wherein said monovalent hydrocarbon radicals are selected from aryl radicals or alkaryl radicals.

10. The polymer of claim 1 wherein said carbonate polymer is a copolyester-carbonate.

11. The polymer of claim 10 wherein R and $R^1$ are independently selected from monovalent hydrocarbon radicals.

12. The polymer of claim 11 wherein said monovalent hydrocarbon radicals are selected from alkyl radicals, cycloalkyl radicals, aryl radicals, aralkyl radicals, or alkaryl radicals.

13. The polymer of claim 12 wherein said monovalent hydrocarbon radicals are selected from aryl radicals or alkaryl radicals.

14. The polymer of claim 1 which further has admixed therewith an inert filler.

15. The polymer of claim 14 wherein said filler is selected from mineral fillers.

16. The polymer of claim 1 which further has admixed therewith a flame retardant amount of at least one flame retardant compound.

17. The polymer of claim 16 wherein said flame retardant compound is selected from the alkali or alkaline earth metal salts of organic sulfonic acids.

18. The polymer of claim 1 wherein y is one.

19. The polymer of claim 18 wherein A is a divalent hydrocarbon radical.

20. The polymer of claim 19 wherein said divalent hydrocarbon radical is 2,2-propylidene.

21. The polymer of claim 20 wherein n is zero.

* * * * *

UNITED STATES PATENT AND TRADEMARK OFFICE
CERTIFICATE OF CORRECTION

PATENT NO. : 4,661,567

DATED : April 28, 1987

INVENTOR(S) : John A. Tyrell and Gary L. Freimiller

It is certified that error appears in the above-identified patent and that said Letters Patent is hereby corrected as shown below:

Cover page -  add [73] Assignee:    - General Electric Company -

Signed and Sealed this

Twenty-second Day of March, 1988

Attest:

DONALD J. QUIGG

Attesting Officer

Commissioner of Patents and Trademarks